(12) United States Patent
Rinnan et al.

(10) Patent No.: US 8,857,360 B2
(45) Date of Patent: Oct. 14, 2014

(54) DEVICE FOR CONTROLLING THE POSITION OF AN INSTRUMENT CABLE TOWED IN WATER

(75) Inventors: Arne Rinnan, Trondheim (NO); Ola Erik Fjeldstad, Trondheim (NO); Kjell Edvardsen, Flataasen (NO); Snorre Bache, Spongdal (NO); Morten Wexels Rieser, Trondheim (NO)

(73) Assignee: Kongsberg Seatex AS, Trondheim (NO)

( * ) Notice: Subject to any disclaimer, the term of this patent is extended or adjusted under 35 U.S.C. 154(b) by 252 days.

(21) Appl. No.: 12/745,272

(22) PCT Filed: Dec. 16, 2008

(86) PCT No.: PCT/NO2008/000450
§ 371 (c)(1),
(2), (4) Date: Aug. 17, 2010

(87) PCT Pub. No.: WO2009/088291
PCT Pub. Date: Jul. 16, 2009

(65) Prior Publication Data
US 2010/0307402 A1 Dec. 9, 2010

(30) Foreign Application Priority Data

Jan. 9, 2008 (NO) .................................. 20080145
Sep. 4, 2008 (NO) .................................. 20083830

(51) Int. Cl.
*B63G 8/18* (2006.01)
*G01V 1/38* (2006.01)
*B63B 21/66* (2006.01)

(52) U.S. Cl.
CPC .............. *G01V 1/3826* (2013.01); *B63B 21/66* (2013.01)
USPC ........................................................ 114/245

(58) Field of Classification Search
USPC ........ 114/242–246; 367/16, 17, 130; 343/709
See application file for complete search history.

(56) References Cited

U.S. PATENT DOCUMENTS

| 4,314,363 | A | * | 2/1982 | Thigpen et al. ................. 367/16 |
| 4,711,194 | A | | 12/1987 | Fowler |
| 6,016,286 | A | | 1/2000 | Olivier et al. |
| 6,144,342 | A | * | 11/2000 | Bertheas et al. .............. 343/709 |
| 6,148,759 | A | * | 11/2000 | Taylor, Jr. ..................... 114/312 |
| 6,525,992 | B1 | | 2/2003 | Olivier et al. |
| 6,674,223 | B2 | * | 1/2004 | Kim .............................. 313/402 |
| 7,036,451 | B1 | * | 5/2006 | Hutchinson .................... 114/364 |
| 7,047,898 | B2 | * | 5/2006 | Petersen et al. ............... 114/244 |
| 7,092,315 | B2 | | 8/2006 | Olivier |
| 7,423,929 | B1 | | 9/2008 | Olivier |
| 7,933,163 | B2 | * | 4/2011 | Fossum et al. .................. 367/16 |
| 8,113,135 | B2 | * | 2/2012 | Catherin et al. .............. 114/244 |

* cited by examiner

*Primary Examiner* — Lars A Olson
*Assistant Examiner* — Andrew Polay
(74) *Attorney, Agent, or Firm* — Ladas & Parry LLP

(57) ABSTRACT

A control device (10, 50, 100) for controlling the position of an instrumented cable towed in water, such as a marine seismic streamer, and/or a towed instrumented cable array (streamer) with the possibility to control the individual instrumented cables, both in shape and position, in relation to other instrumented cables and by that counteract cross currents and/or other dynamic forces which affect a towed array behind a seismic survey vessel. The control device (10, 50, 100) is adapted for plain and rapid mounting and demounting so that the streamer easily can be deployed and recovered, and in an easy way be reeled onto and out from a drum. The control device is further entirely or partly arranged for wireless/contactless transfer of energy and/or communication, i.e. signals/data, between a main body and wings. The control device, motor and drive gear housings (51) provided with wings (52) or wings (11, 102) house drive means (22), power supply (23), electronics and sensor means.

29 Claims, 11 Drawing Sheets

DEVICE FOR CONTROLLING THE POSITION OF AN INSTRUMENT CABLE TOWED IN WATER

BACKGROUND OF THE INVENTION

The invention relates to devices for controlling the position of an instrumented cable towed in water, such as a marine seismic streamer, and/or an instrumented towed cable array (streamer array), and especially to control devices where the wings or motor and drive gear housings provided with wings house drive means, power supply, electronics and sensor means.

DESCRIPTION OF RELATED ART

A marine seismic streamer is an elongate cable-like structure, (typically up to several thousand meters long), which contains an array of hydrophones and associated electronic equipment along its length, and which is used in marine seismic surveying. In order to perform a 3D/4D marine seismic survey, a plurality of such streamers is towed behind a seismic survey vessel. Acoustic signals produced by the seismic sources are directed down through the water into the sea bed beneath, where they are reflected from the various strata. The reflected signals are received by the hydrophones, and then digitized and processed to build up a representation of the earth strata in the area being surveyed.

The streamers are typically towed at a constant depth of about five to ten meters, in order to facilitate the removal of undesired "ghost" reflections from the surface of the water. To keep the streamers at a constant depth, control devices known as "birds" are attached to each streamer at intervals of 200 to 300 meters.

Low frequency depth variations and lateral motions are inevitable. The main reasons for streamer depth variations are long periodic waves. In general, the worst-case situation is when towing in the same direction as the swell. Streamer lateral motions are mainly due to sea current components perpendicular to the towing direction. In the case of both swell and cross-current influences, the risk of streamer entanglement is therefore increased.

The streamer tension decreases proportional to the distance from the towing point. Therefore, low frequency streamer lateral and vertical motion tends to have larger amplitudes closer to the tail. However, the forces acting perpendicular to the streamer are non-uniformly distributed over the streamer length, and change over time as the towed array moves forward.

During a seismic survey, the streamers are intended to remain straight, parallel to each other, equally spaced and at the same depth. However, after deploying the streamers, it is typically necessary for the vessel to cruise in a straight line for at least three streamer lengths before the streamer distribution approximates this ideal arrangement and the survey can begin. This increases the time taken to carry out the survey, and therefore increases the cost of the survey. However, because of sea currents, the streamers frequently fail to accurately follow the path of the seismic survey vessel, sometimes deviating from this path at an angle, known as the feathering angle. This can adversely affect the coverage of the survey, frequently requiring that certain parts of the survey be repeated. In really bad circumstances, the streamers can actually become entangled, especially at the end of the streamers, which can cause great damage and considerable financial loss.

Several patents cover control devices for seismic streamers.

U.S. Pat. No. 5,443,027 (Norman, L. Owsley et al.) describes a lateral force device for displacing a towed underwater acoustic cable, providing displacement in the horizontal and vertical directions, the device has a rotationally mounted body.

U.S. Pat. No. 6,011,752 (Loran, D. Ambs et al.) describes a seismic streamer position control module having a body with a first end and a second end and a bore therethrough from the first end to the second end for receiving a seismic streamer therethrough, at least one control surface, the at least one recess in which is initially disposed the at least one control surface movably connected to the body for movement from and into the at least one recess and for movement, when extended from the body, for attitude adjustment.

U.S. Pat. No. 6,144,342 (Bertheas, Jean et al.) describes a method for controlling the navigation of a towed linear acoustic antenna. Control devices equipped with variable-incidence wings are fixed onto the antenna. Through a differential action, the wings allow the control device to be turned about the longitudinal axis of the antenna, so that a hydrodynamic force oriented in any given direction about the longitudinal axis of the antenna is achieved. The control device can be detached automatically as the antenna is raised, so that the antenna can be wound freely onto a drum. This method also allows full control of the deformation, immersion and heading.

WO 03/008906 A2 (Nicholson, James et al.) describes a control device for controlling the position of a marine streamer comprising an annular aerofoil, a mount for mounting the aerofoil onto and around the streamer, and control means for controlling the tilt and/or rotation of the annular aerofoil to thereby adjust the lateral position and/or depth of the streamer.

U.S. Pat. No. 6,671,223 B2 (Bittleston, Simon Hastings) describes a control device or "bird" for controlling the position of a marine seismic streamer, which is provided with an elongate, partly flexible body which is designed to be electrically and mechanically connected in series with a streamer. In a preferred form the control device has two opposed wings which are independently controllable in order to control the streamer's lateral position, as well as depth.

U.S. Pat. No. 6,879,542 B2 (Soreau, Didier) describes a bird with a pair of horizontal wings and a pair of vertical wings for lateral and horizontal control, respectively. The wing rotation is controlled by pendulum forces on lateral force wing pair.

U.S. Pat. No. 6,459,653 (Kuche, Hans-Walter) describes a collapsible depth controller for mounting in relation to seismic cables or similar devices, comprising two wings, each being rotatably connected to a main body relative to a first axis of rotation perpendicular to the longitudinal direction of the depth controller.

U.S. Pat. No. 5,619,474 (Kuche, Hans-Walter) describes a depth control apparatus for seismic streamers, comprising a central unit adapted for inserted mounting in the streamer, substantially in axial alignment with the streamer, a housing which can rotate about the central unit and carries at least one control wing being angularly adjustable about a transverse axis, adapted to be substantially horizontal in operative position, and an electric motor for adjusting the angle of the control wing about the transverse axis.

U.S. Pat. No. 6,016,286 (Olivier, Andre W. et al.) describes a depth control device for an underwater cable which includes a rotary actuator having a rotating output shaft connected to a swash plate. Rotation of the swash plate by the actuator causes a rocker arm to pivot about an axis transverse to the axis of the output shaft.

U.S. Pat. No. 6,525,992 (Olivier, Andre W. et al.) describes a device for controlling the position of an underwater cable comprising a body, first and second actuators, and a pair of wings. The body is stationary mountable to the underwater cable and the first and second actuators are disposed in the body. Each wing has an axis of rotation and the wings are coupled to the first and second actuators to control the depth and the horizontal position of the underwater cable in the water.

Control devices in accordance with these current designs suffer from a number of disadvantages. As the control devices (in some of the publications mentioned above) hang beneath the streamer, they produce considerable noise as they are towed through the water. This noise interferes with the reflected signals detected by the hydrophones in the streamers. Some of the control devices comprise a pair of wings or rudders mounted on a rotatable structure surrounding the seismic streamer in order to generate lift force in a specified direction. This is an expensive and relatively complex electromechanical construction that is highly vulnerable in underwater operations. Some of the control devices mentioned in the publications above operate with a pair of wings or rudders in a bank-to-turn manoeuvre, so that the roll angle for the control device is defined from desired total force. This adds complexity to the local control loop for the superior control system, and provides poorer stability properties by that very fact that the roll angle must be continuously adjusted according to changes in desired total force, especially induced by the depth control.

Further, it is not known solutions for wireless/contactless transfer of energy and signals/data between the main body and wings, something which will result in a more robust system, which are less exposed to function failure or mechanical failure.

SUMMARY OF THE INVENTION

The main object of the invention is to provide a control device which fully or partly alleviates the disadvantages of the mentioned current designs. It is further an object to provide a control device which is plain to mount and demount, so that the streamer easily can be deployed and recovered, and that it can be reeled onto and out of a drum in an easy way. It is further an object of the present invention that the control device should contribute to that the streamer can withstand the affection from unverifiable forces in the environment around the streamer. It is further an object that the control device should have a low power requirement for controlling, and that it can provide a control force in an arbitrary direction, depending on the angle of rotation. It is further an object of the present invention that it should provide opportunities for untwisting twists applied to the streamer. It is further an object of the invention that it should allow faster course change operations and shorter finishing and deploying of streamers, and shorter run-ins after line-turns and other operations to an approximately ideal position.

Finally it is an object of the invention to provide a control device which entirely or partly is arranged for wireless/contactless transfer of energy and/or communication, i.e. signals/data, between main body and wings.

First control device according to the invention is described according to the preamble of claim.

Second control device according to the invention is described according to the preamble of claim.

A control device for controlling a seismic streamer, especially a multi-section streamer, according to the present invention, is based on a smart wing concept or a combined motor and drive gear housing provided with a wing in one unit. The control device is formed by a main body and at least three wings, so-called smart wings, or at least three motor and drive gear housings provided with wings. The term smart wing is used to illustrate that wing, power supply (batteries), control means, drive means, and sensors are integrated into the one and same unit, referred to as smart wing, which wing easily can be attached and detached. The alternative including motor and drive gear housing is used to illustrate that power supply (batteries), control means, drive means, and sensor are integrated into the one and same unit, referred to as a motor and drive gear housing which is provided a wing, which motor and drive gear housing forms a detachable unit which easily can be attached and detached.

The main body is preferably elongate and mainly tubular, and is at its ends provided with mechanical and electrical connection means to be arranged in series between two adjacent sections of a streamer. Further, the main body is at adapted positions provided with fastening and connection means for smart wings or motor and drive gear housings provided with wings, which main body is adapted to the different alternatives.

The control device includes preferably at least three such smart wings or motor and drive gear housings provided with wings, evenly distributed around the main body.

The smart wings are preferably duplex in the form of a fastening part and a wing part, where the fastening part is adapted for connection to the main body via adapted fastening and connection means. In addition the smart wings preferably include a guard attached to the wing part by means of suitable means or is integrated into the wing part. The guard has a mainly elongate ellipse-shape, with an interior and exterior surface, which surfaces preferably have a shape and size similar to the cross sectional shape of the wing. The guard has on the interior surface a protruding element which has a shape similar to the cross sectional shape of the wing, and a size adapted for travelling in mainly rectangular recesses provided in the main body. The purpose of the guard is to prevent objects in the water, such as seaweed, ropes, plastic, etc. from being attached between the wing and the main body. The wing part housing mechanics, electronics, control means and sensors, is arranged to the fastening part by means of a shaft, and the wing part extends perpendicular from the fastening part, and accordingly the main body. The wing part includes an exterior protective housing, preferably made of hard plastics, which housing is formed by two parts assembled to one unit with wing shape/rudder shape, which has a tapering width out from the main body towards the end of the wing part.

The fastening part has a shape adapted to the fastening and connection means of the main body for detachable arrangement, and can thus be considered as a quick release coupling. The fastening part further includes connection means for connecting the smart wing electronically and for signals to the streamer/main body.

The motor and drive gear housings are adapted for fastening and connection to the main body via adapted fastening and connection means connecting the motor and drive gear housings both mechanically and electronically/for signals to the streamer/main body, and adapted for mutual fastening via adapted fastening means. The motor and drive gear housing, which house mechanics, electronics, control means and sensors, are connected to the wing part by means of a shaft, and the wing extends perpendicular out from the motor and drive gear housing, and accordingly the main body. The wing part is also here preferably formed by to parts, preferably in hard plastics, which are assembled into one unit with a wing shape/rudder shape, which has a tapering width out from the main body towards the end of the wing part.

Each wing part, both for the smart wing and for the alternative with motor and drive gear housings provided with a wing in one unit, is thus rotatable about an axis extending transversal of the streamer and the wings will respond to control signals and sensor means for independent adjustment of the respective angular position of the mentioned wing, for in this way to control the lateral and vertical position of the streamer. The control device further includes sensor means, such as a roll sensor arranged in the main body, to determine the rotation position of the streamer and main body in a plan perpendicular to the longitudinal axis of the streamer. The control device is preferably further also provided with a depth sensor, such as a pressure sensor, arranged in the main body.

By the use of the control device in a multi-section streamer including an electrical energy line, the control means, at least partly, are arranged to receive electric energy from the electrical energy line. As the streamer also includes a control line, the control means are preferably arranged to receive signals from the control line.

To avoid streamer malfunction in case of mechanical damage of the control means (e.g. leakage), the feed-through of conductors between the streamer sections are separated from the wing mechanism, control means and sensors.

The control means include electrical motors, preferably also gear and clutch, and can also include means for measuring the rotation position of the streamer and control means, means for measuring depth and means for measuring mutual position between the streamers/control devices.

The control means are preferably arranged to the house of the smart wings or to the motor and drive gear housings by means of suitable means.

A preferable control strategy used on a control device according to the invention is not based on a traditional bank-to-turn manoeuvre where the rotation position is determined from a combination of commanded lateral and vertical force, which in general continuously vary. Instead the control device is controlled to a predefined rotation position given by a commanded lateral force alone, which in general is static in longer periods of time. The lift is approximately proportional with the plane area of the wings, with the square velocity through water, and with the attack angle of the wing, which is controllable through the control means.

This is only one of many control methods which can be implemented for a streamer which is provided with control devices according to the invention, something which is described in the applicants' at the same time filed application NO 20063182.

The present application will therefore focus on the design of the control device and not methods for controlling a streamer, but references are herein made to the applicants' at the same time filed application NO 20063182 regarding control of streamers and similar.

The control means are operated on basis of commando messages/settings through the streamer from a control unit onboard a vessel performing the operation.

As mentioned, the smart wings or motor and drive gear housings provided with wings detachably arranged to the main body, and the control devices are preferably evenly distributed along the entire streamer length, preferably with approximately the same distance between.

The control devices are arranged to control both the vertical and the lateral movement, preferably at the same time. The control means can set up the commanded lift by actuators (motors). The smart wings and motor and drive gear housings provided with wings are preferably arranged symmetrically around the length axis of the streamer and main body.

By means of the present invention it is provided a control device which easily can be mounted and demounted into a streamer. This especially by that the wing, control means, drive means and power supply are made as a detachable unit. As a streamer is to be reeled onto a drum, the smart wing or motor and drive gear housings provided with wings can easily be removed and will thus not cause any problems for the collection on the drum. Another advantage with the present invention is that if drive means, wing or something else should fail or be damaged, it is easy to replace the entire smart wing or motor and drive gear housings provided with wings, without replacing the entire control device.

In that the smart wing or motor and drive gear housings provided with wings include the most of the electronics, sensors, power supply and drive means it is also possible, in addition to above, to provide a compact design.

According to one embodiment of the control device it is provided with wireless/contactless transfer of communication, i.e. signals/data, and energy between the main body and wings. This results in that there is no need for mechanical connections for energy and communication between main body and wings, and it is thus no risk for leakage. Such a solution only requires a mechanical connection of the wings to the main body.

Wireless/contactless transfer of energy and/or communication can further be used for the detachment of the wings or motor and drive gear housings provided with wings from the main body without using tools. It also provides opportunities for remote detachment of the wings or motor and drive gear housings provided with wings. In that the control device is provided with wireless/contactless communication it will also be possible with communication with an external unit for calibration and diagnostics, for example on the quarterdeck of a vessel.

Preferable details and features of the invention will appear from the example description below.

BRIEF DESCRIPTION OF THE DRAWINGS

The invention will below be described in detail with references to the Figures, where.

DESCRIPTION OF THE PREFERRED EMBODIMENTS

Figure 1:
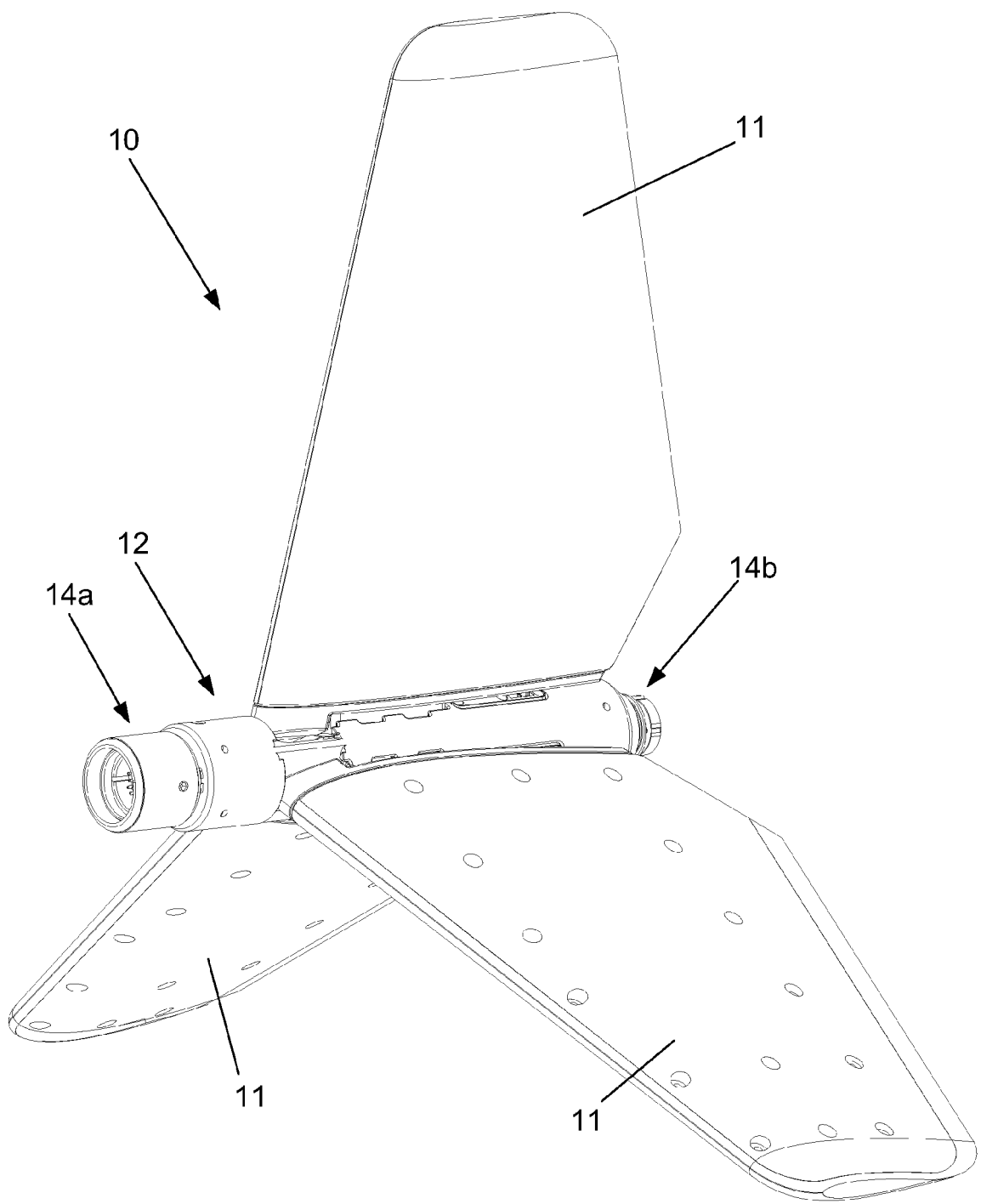
FIG. 1 shows a first embodiment of a control device according to the invention, for connection between two streamer sections.

FIG. 1 shows a first embodiment of a control device 10 according to the invention for connection in series between two adjacent streamer sections of a multi-section streamer. A control device 10 according to a preferred embodiment of the invention includes three similar wings 11, so-called smart wings, which are evenly distributed around a main body 12, which is shown in detail in FIG. 2, and is a so-called three-axis bird. In the example shown as three smart wings 11, it will be 120 degrees between the wings 11.

Figure 2:
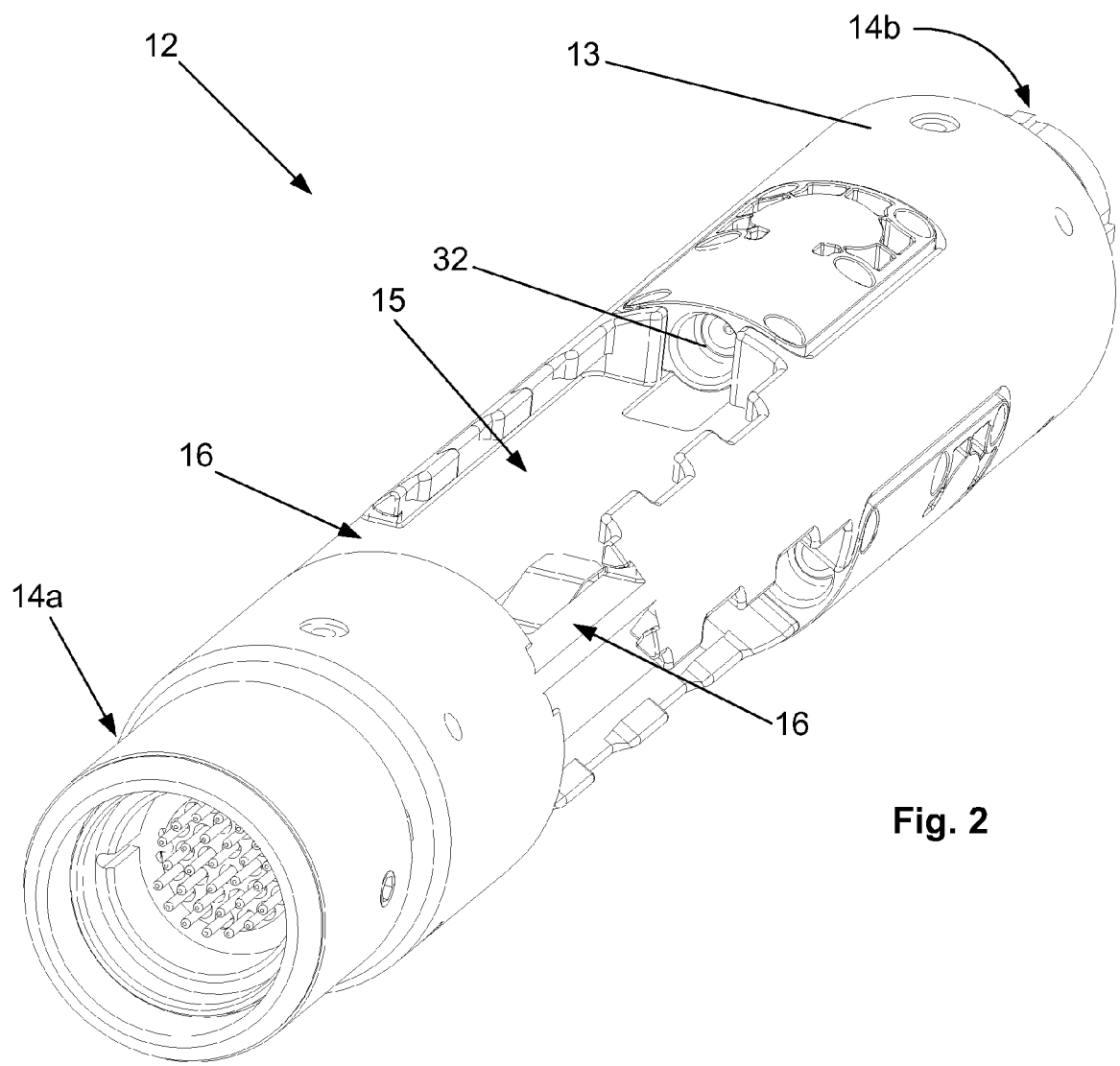
FIG. 2 shows details of a main body of the control device in FIG. 1.

Referring now to FIG. 2 which shows details of the main body 12. The main body 12 is mainly an elongate streamlined tubular housing 13, which at its end includes connection means 14a and 14b adapted for mechanical and electrical connection in series in a multi-section seismic streamer, of the kind being towed behind seismic survey vessel. The connection means 14a-b are for this adapted with similar connection points (not shown) in each end of each streamer section, which connection points normally are used to connect two adjacent streamer sections together.

The main body 12 includes further specially shaped fastening and connection means 15 for the connection of the smart wings 11, both mechanical and electrical. The main body 12 is in addition preferably provided with mainly rectangular recesses 16 to allow the travelling of a guard 29, further described below. The main body 12 is further provided with a circuit card and electronics for communication with an external control unit via the control line of the streamer. The main body 12 is preferably arranged so that the feed-through of conductors between the streamer sections are separated from the wing mechanisms, drive means, control means and sensors. This is to avoid function failure in case of mechanical damage of the control device 10, e.g. leakage.

The main body 12 preferably further includes a roll sensor (not shown) and/or a depth meter (not shown), preferably in the form of a pressure sensor.

Figure 3:
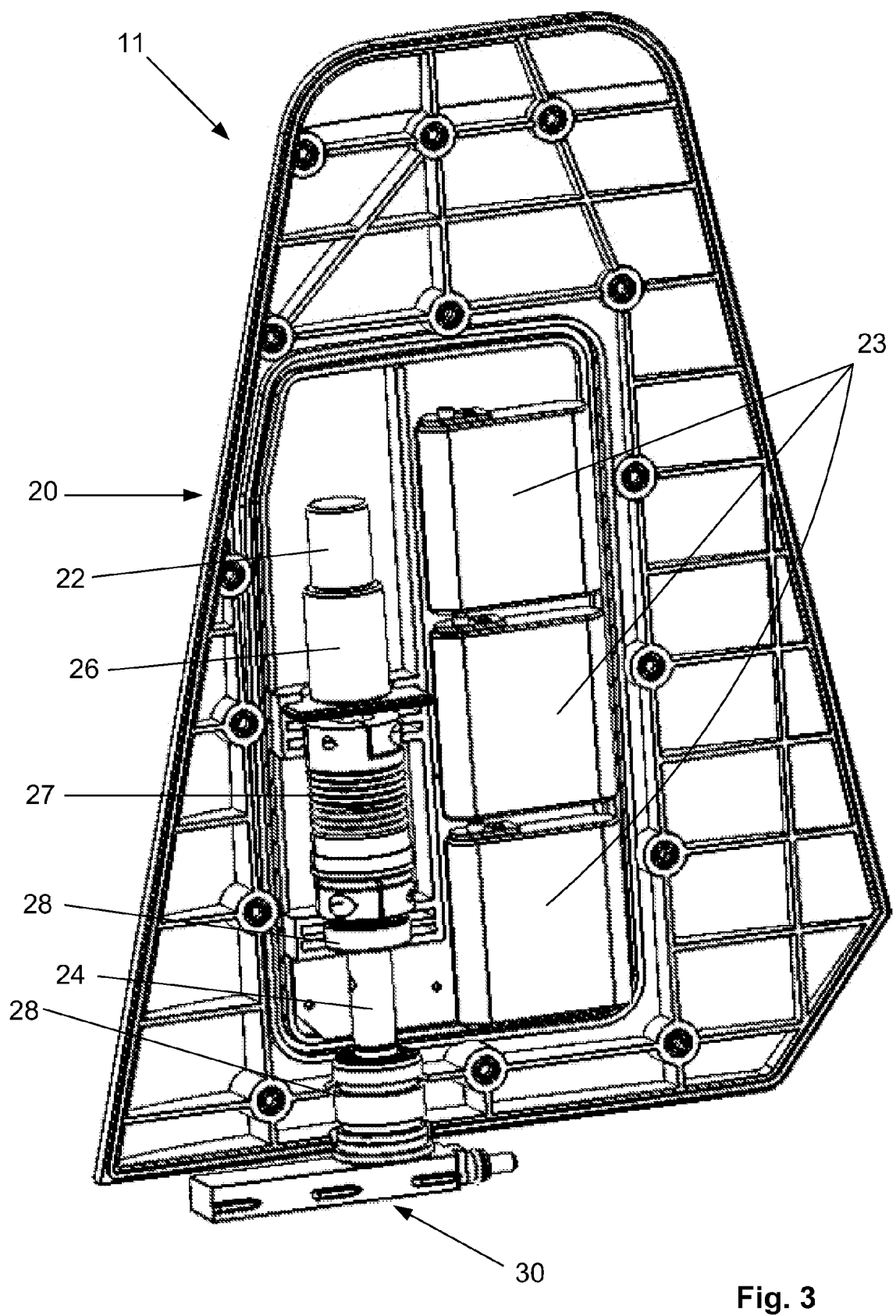
FIG. 3 shows a partly cut-trough view, showing details of a wing part of the control device in FIG. 1.

Referring now to FIG. 3 which shows a partly cut-through view of a smart wing 11 according to the invention. The control device 10 is, as mentioned, provided with three smart wings 11, or rudders, which smart wings 11 extend perpendicular from the longitudinal axis of the main body 12 and accordingly the streamer. The smart wings 11 are preferably formed by two parts, a wing part 20 and a fastening part 30. In addition it is preferably arranged a guard 29 (shown in FIG. 4) between the wing part 20 and the fastening part 30, further described below. The fastening part 30 is adapted for fastening and connection with the main body 12 via its fastening and connection means 15. The fastening and connection means 15 and the fastening part 30 are preferably designed so that a quick-release coupling is provided, both mechanically and electrically, further described below. The wing part 20, which house the drive means 22, power supply 23 (batteries) and possible sensors (not shown), is connected to the fastening part 30 by means of a shaft 24, and the wing part extends thus perpendicular from the fastening part 30, and accordingly the main body 12. The wing part 20 includes an exterior protective housing, preferably in hard plastics, which housing preferably is formed by two parts assembled together into one unit with wing shape/rudder shape, which has a tapering width out from the main body 12 towards the end of the wing part 20.

The drive means 22 is preferably one or more electrical motors which further preferably is connected to a gear 26 which further preferably is connected to the shaft 24 via a clutch 27. Neither gear nor clutch is a necessity, but will be a great advantage in connection with the controlling of the system and for the operating time of the control device. The drive means 22 are provided with energy from the conductors in the streamer, via at least one rechargeable buffer battery 23 for back-up force at the lack of energy and to avoid overload in the energy system of the streamer.

The drive means 22 are further arranged to the wing part 20 in a suitable manner and includes preferably sleeves and bearings 28 to achieve a fixed positioning of the shaft 24 and to ensure as low resistance as possible in rotation of the shaft 24.

Figure 4:
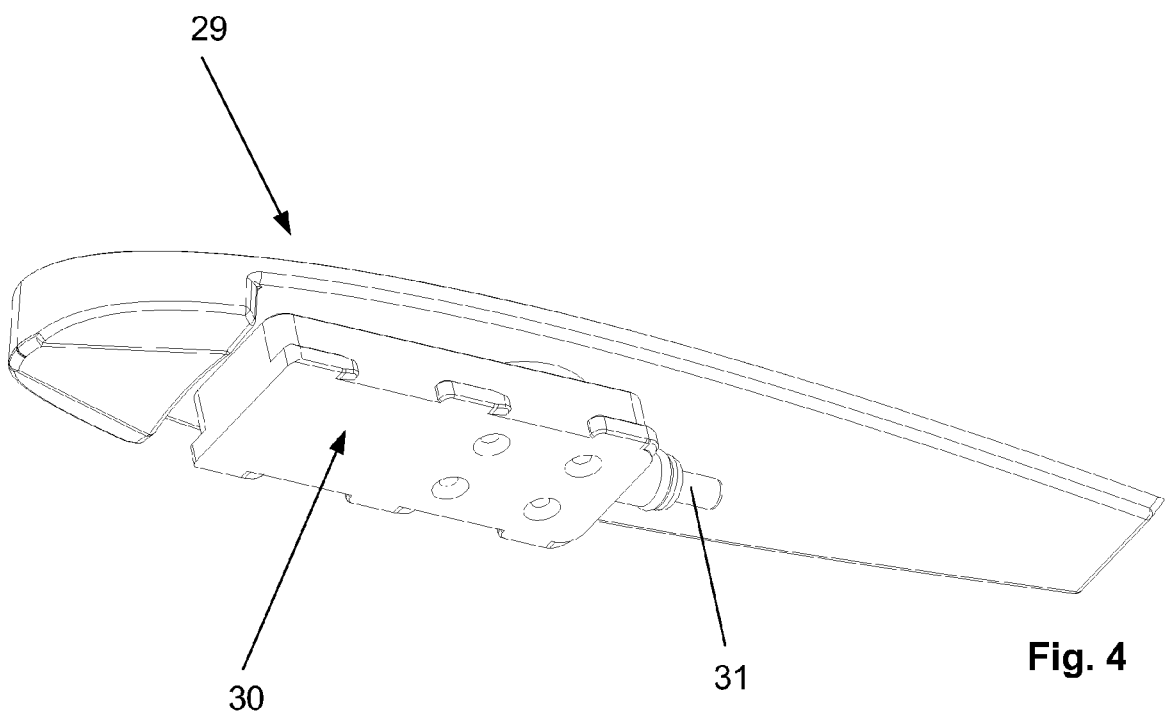
FIG. 4 shows details of a guard and a fastening part of the control device in FIG. 1, seen from the connection side.

Referring now to FIG. 4 which shows details of a guard 29 and a fastening part 30 according to the invention. The guard 29 has mainly an elongated ellipse-shape, with an exterior and interior surface, which surfaces have a shape and size similar to the cross-sectional shape of the wing 11, and a size adapted for travelling in the rectangular recesses 16 in the main body 12. The guard 29 is preferably either arranged to the wing 11 by means of suitable means or integrated into the wing 11. The guard 29 will thus rotate with the wing 11 and the guard has as purpose to prevent objects in the water, such as seaweed, ropes, plastics, driftwood, etc. from getting attached between the main body 12 and the wing 11.

The fastening part 30 has, as mentioned, a shape which is adapted to the fastening and connection means 15 of the main body 12 for detachable fastening, and can be considered as a quick-release coupling. The fastening part 30 includes further connection means 31 for connecting the smart wing electrical and for signals to the streamer/main body 12 via adapted connection means 32 (FIG. 2) in the main body 12.

Each wing part 20 (and guard 29) is thus rotatable about an axis extending transversal to the streamer, and the wings 11 will respond to control signals and sensor means for independent adjustment of the respective angular position for the mentioned wing part 20, in this way to control the lateral and vertical position of the streamer.

As the smart wings 11 are disconnected from the main body 12, the streamer can be reeled in onto a drum with the main body 12 still connected to the streamer. In the same way the streamer can easily be deployed from a drum and successively be provided with the smart wings 11 as the streamer is deployed.

The control device 10 is preferably connected to an external control system of a survey vessel, e.g. a Seismic Towed Array Positioning System, via a streamer data bus. The control device uses the data bus for transferring status from the sensors and information on mechanical function and force.

The control parameters are transferred to the control devices 10 for controlling the control devices 10 in the Y and Z direction. The control means in the control devices 10 adjust the wing part 20 to correct position by means of the drive means 22.

The control device can further be provided with a wing position sensor and/or an acoustic position sensor and/or sensors for measuring roll angle and/or depth sensor or similar suitable means which can be used for the controlling of the streamer.

Many different control strategies can as mentioned be used on a control device according to the invention, and this is thus not mentioned broadly herein, but references are made to the application NO 20063182 in the name of the applicant for a suitable method for controlling.

Figure 5:
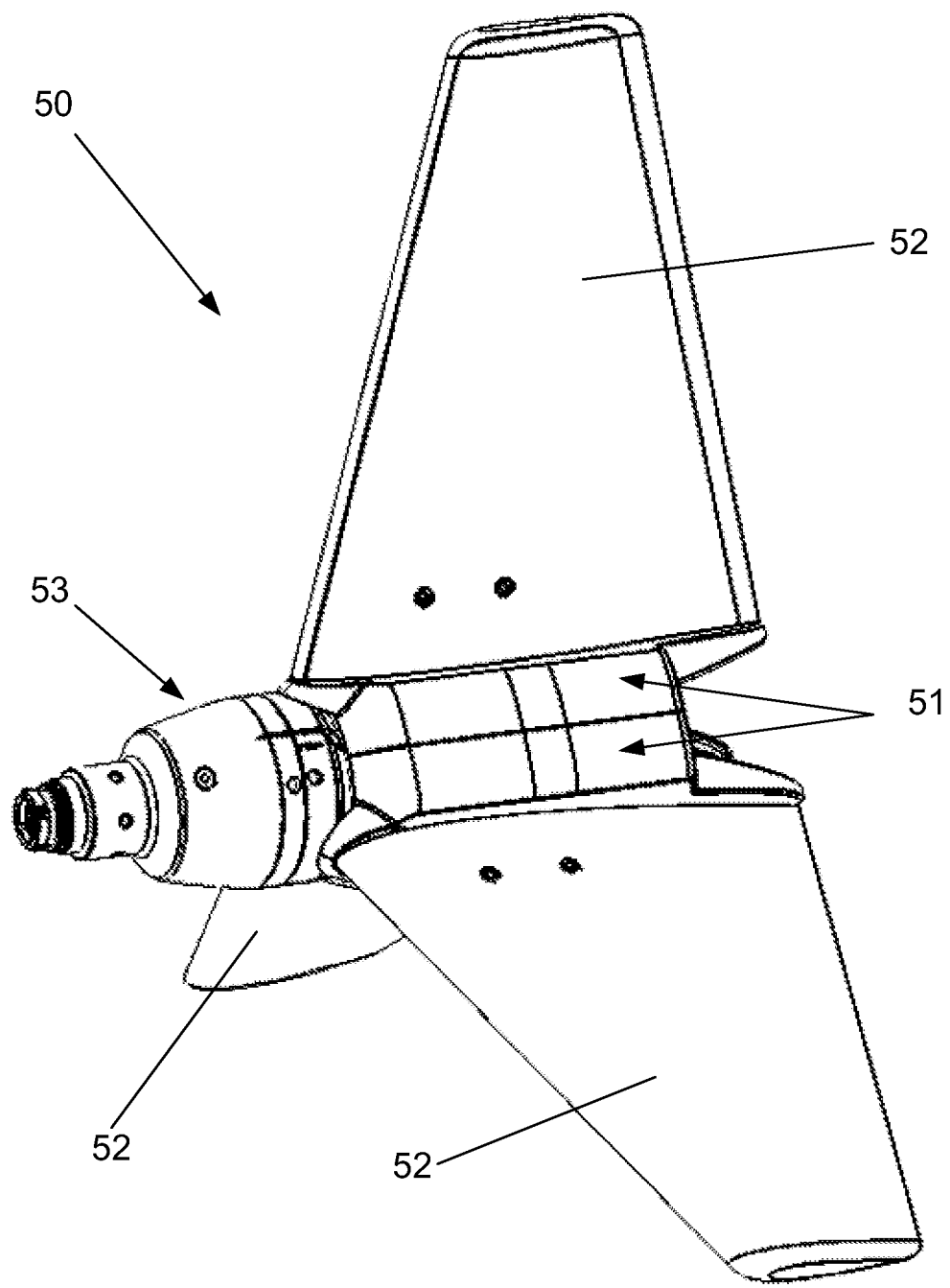
FIG. 5 shows a control device according to a second embodiment of the invention for connection between two streamer sections.

Referring now to FIG. 5 which shows a second embodiment of a control device 50 according to the invention.

A second embodiment of the invention is based on detachable motor and drive gear housings provided with wings 52. Also this embodiment is connected in series between two adjacent streamer sections of a multi-section streamer. A control device 50 according to a second embodiment of the invention includes preferably three equal motor and drive gear housings 51 provided with wings 52, evenly distributed around a main body 53, as shown in detail in FIG. 5, and is a so-called three-axis bird. In the shown example with three wings 52, it will be 120 degrees between the wings 52.

Figure 6:
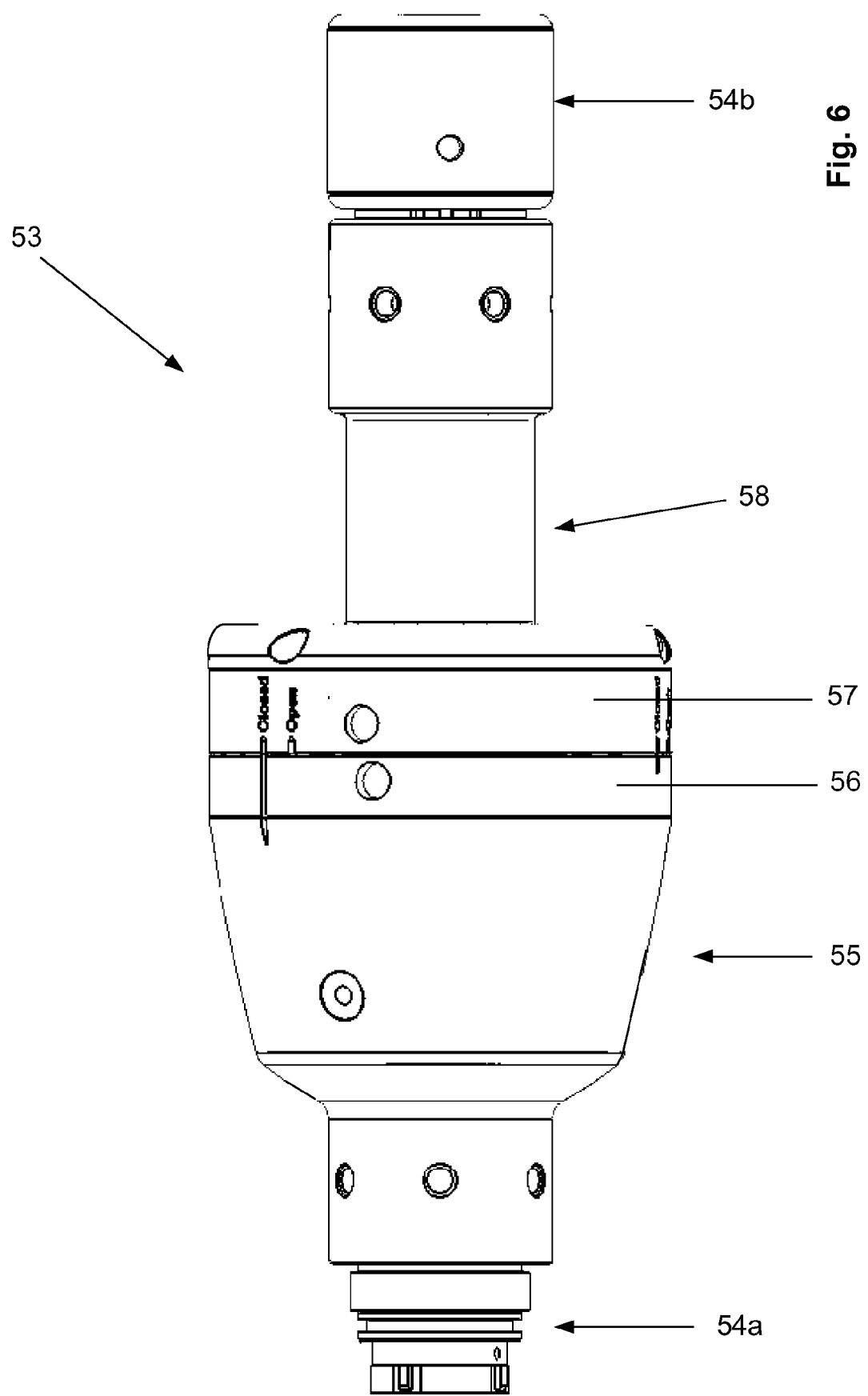
FIG. 6 shows details of a main body of the control device in FIG. 5.

Referring now to FIG. 6 which shows details of the main body 53. The main body 53 is preferably elongate and tubular, and is at its ends provided with connection means 54a and 54b, adapted for mechanical and electrical connection in series in a multi-section streamer, of the kind being towed behind a seismic survey vessel. The connection means 54a-b are for this adapted with corresponding connection points (not shown) at each end of each streamer section, which connection points normally are used to connect two streamer sections together.

The main body 53 is formed by four parts assembled together into one unit, which parts include a conical end part 55, a main part 56, a lock disc 57 and a end part 58. The connection means 54a-b are arranged at the conical end part 55 and end part 58, respectively.

Figure 7:
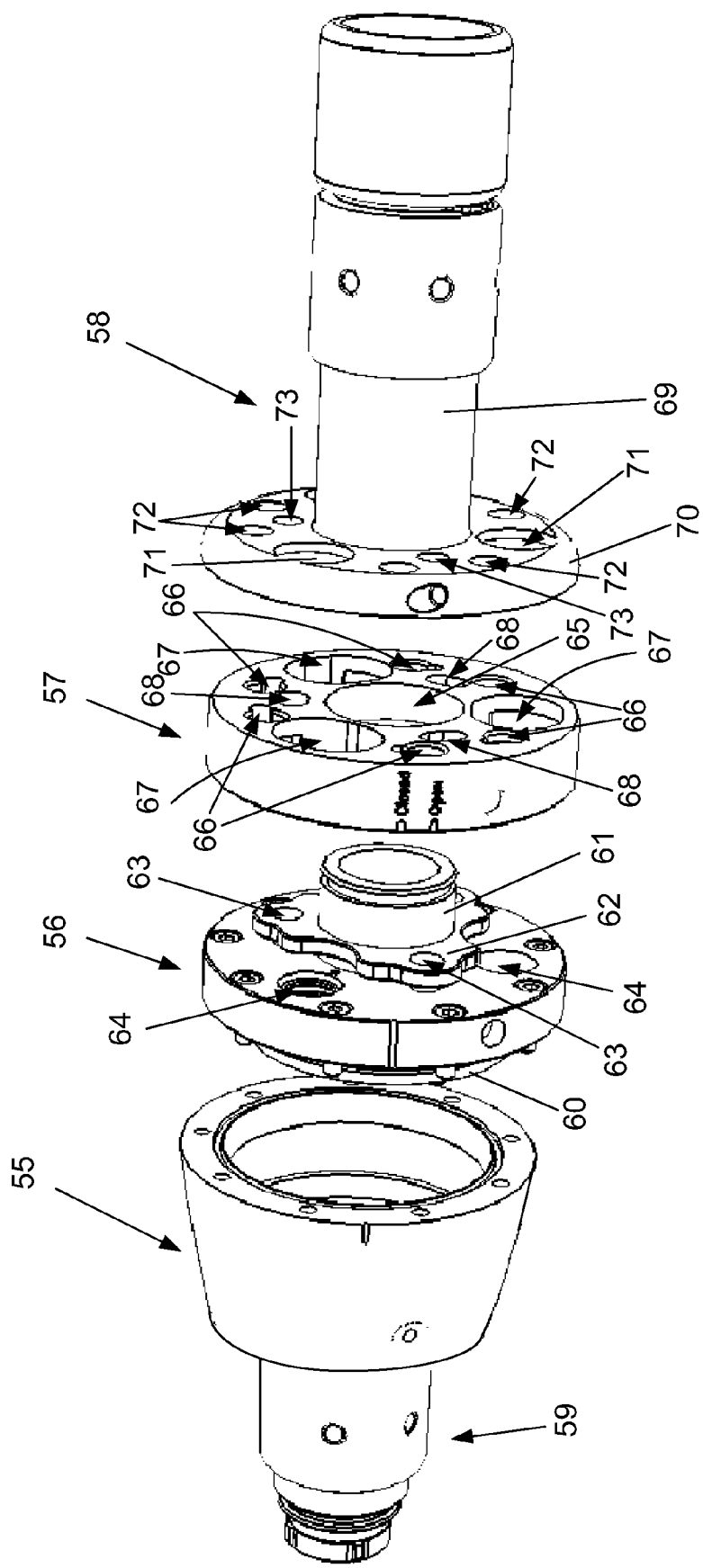
FIG. 7 is a split view of the main body in FIG. 6.

Referring now to FIG. 7 which shows a split view of the main body 53 showing details of the important parts of the main body 53.

The conical end part 55 is mainly tubular, with a tapering end against a central projection 59, in which projection the connection means 54a are arranged.

Against the conical end art 55, the main body 53 includes a main part 56, which mainly is a circular disc with an outer circumference as the conical end part 55. The main part 56 has at the side facing the conical end part 55 a circular flange 60 adapted to the inner circumference of the conical end part 55. Both the conical end part 55 and the main part 56 are provided with adapted means for secure fastening together, such as screws arranged in connection with the main part 56, and threaded holes in the conical end part 55. The main part 56 further includes, at the side facing away from the conical end part 55, a central tubular projection 61. On the tubular projection 61 is preferably arranged a specially designed lock plate 62 for locking connections (not shown) for electrical connection and signal connection of the motor and drive gear housings 51. The lock plate 62 further includes, at adapted places, through holes 63 for fastening the lock plate 62 to the main part 56. The main part 56 further includes through holes 64 for insertion of connection means for the connection of motor and drive gear housing 51, further described below. The main part 56 is at the side facing the conical end part also provided with fastening points (not shown) for a circuit card (not shown). The main part 56 further includes threaded holes (not shown) for fastening the end part 58, lock disc 57 and main part 56 together by means of suitable means, further described below.

The lock disc 57 which is mainly circular has an outer circumference adapted to the outer circumference of the main part 56 and the conical end part 55 and has a centrally arranged through hole 65 adapted to the projection 61 of the main for arrangement thereon, against the lock plate 62 of the projection 61 of the main part 56. The lock disc 57 includes specially designed lock holes 66 for the fastening of motor and drive gear housings 51, further described below. In addition the lock plate 57 includes specially designed through holes 67 for insertion of connection points for electrical connection and signal connection of the motor and drive gear housings 51, further described below. In addition the lock plate 57 includes specially designed through holes 68 for the fastening of the end part 58 and the lock disc 57 to the main part 56, further described below. The specially shaped holes 66, 67 and 68 allows the lock disc 57 to travel some in the rotation direction about the projection 61 in connection with locking and unlocking of the motor and drive gear housings 51, further described below.

The end part 58 is formed by a mainly tubular body 69 with a perpendicularly arranged end plate 70 at the end facing the lock plate 57, while the other end is provided with connection means 54b for streamer connection. The end plate 70 is further provided with through holes 71 for insertion of connection points for electrical connection and signal connection for the motor and drive gear housings 51, through holes 72 for insertion of fastening means for motor and drive gear housing 51, and through holes 73 for insertion of fastening means, such as fastening bolts, to fasten the end part 58 via the end plate 70 and the lock disc 57 together with the main part 56. In this way the parts 55, 56, 57 and 58 are fixed together, where the lock disc 57 due to the specially designed holes 66-68 is allowed to rotate between a locked position and an unlocked position in relation to the locking and unlocking of the motor and drive gear housings 51 to the main body, further described below.

In the conical end part 55, as mentioned, electronics (not shown) and a circuit card (not shown) are arranged, which are fixed to the flange 60 of the main part 56 connecting the control device 50 to the streamer control line and energy line.

The main body 53 includes, as mentioned, electrical connection points and signal connection points (not shown), which extend from the circuit card through the holes 64 in the main part, the holes 67 in the lock disc and terminate as a connection point for the motor and drive gear housings 51 at the holes 71 in the end plate 70 of the end part, further described below.

The main body 53 is preferably arranged so that the feed-through of conductors between the streamer sections are separated from the control device 50 to avoid function failure in case of mechanical damage of the control device 50, e.g. leakage.

The main body 53 preferably further includes a roll sensor and/or a depth sensor (not shown), preferably in the form of a pressure sensor.

Figure 8:
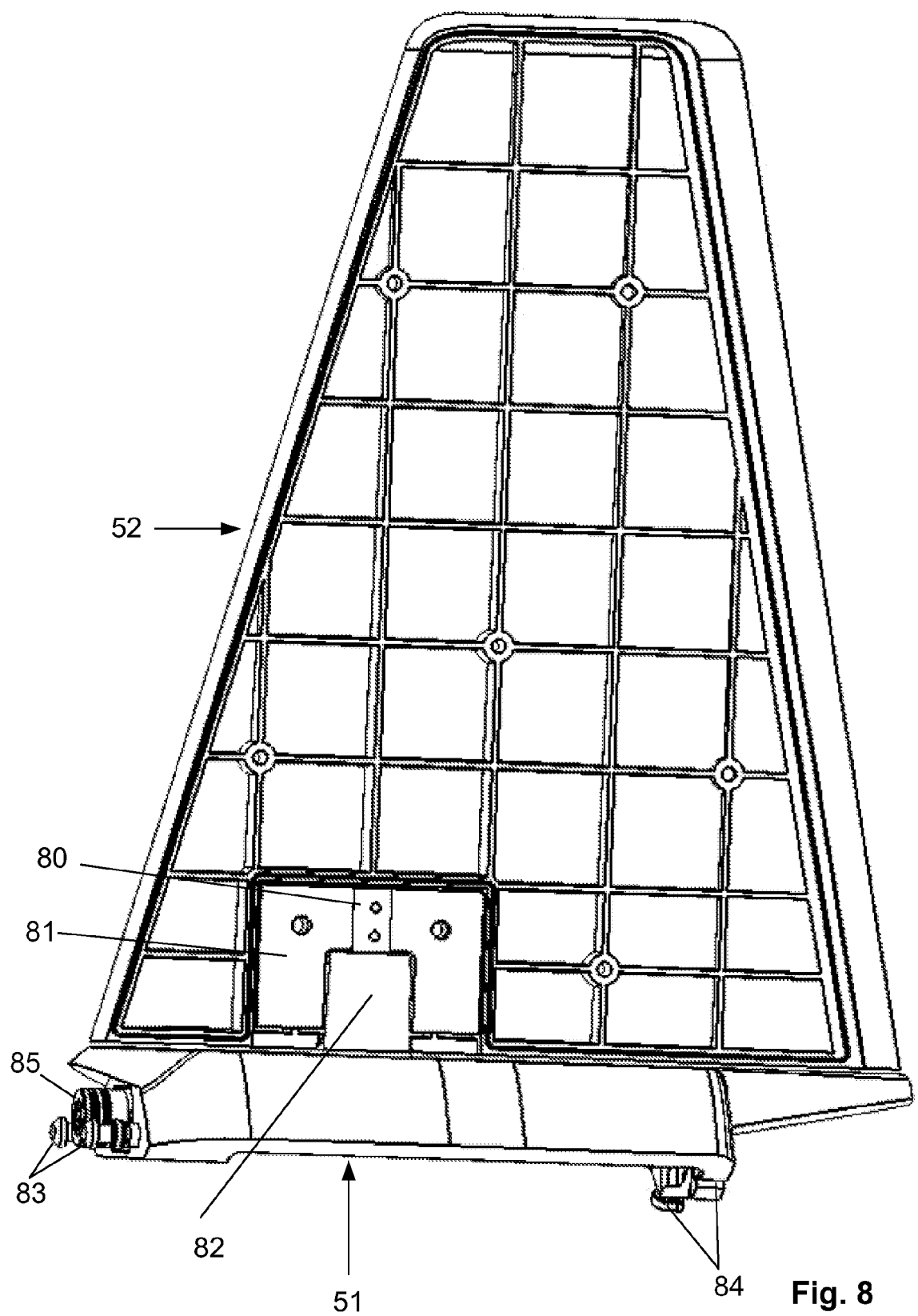
FIG. 8 shows a partly cut-through view, showing details of a motor and drive gear housing provided with wings for the control device in FIG. 5.

Referring now to FIG. 8 which shows a partly cut-through view, showing details of the motor and drive gear housing 51 with wing 52 according to the invention. According to a second embodiment of the invention it is provided a combined unit of a motor and drive gear housing 51 and a wing 52. The control device 50 is, as mentioned, provided with three such units and thus three wings 52, or rudders, which wings 52 extend perpendicularly out from the longitudinal axis of the main body 53.

The motor and drive gear housing 51 is adapted for mechanical fastening and electrical connection and signal connection with the main body 53 via its fastening and connection means, i.e. the specially designed lock holes 66 of the lock disc 57, and the electrical and signal connection means. Preferably the fastening and connection means of the main body 53 and the motor and drive gear housing 51 are designed so that a quick-release coupling, both mechanically and for the electrics/signals, further describe below. The wing 52 is connected to the motor and drive gear housing 51 by means of a shaft 80 which is arranged to the wing 52 by means of suitable means, such as a plate 81. The wing 52 extends thus perpendicularly out from the motor and drive gear housing 51 and accordingly the main body 53. The wing 52 is formed by two equal opposite parts, preferably in hard plastics, which are assembled together to one unit with a wing shape/rudder shape, which has a tapering width out from the main part 53 and motor drive gear housing 51 towards the end of the wing 52.

The motor and drive gear housing 51 includes an exterior protective housing, wherein drive means (not shown), power supply (batteries) and possibly sensor means (not shown) are arranged. The drive means are preferably as in the first embodiment one or several electrical motors (not shown) which preferably is/are connected to a gear (not shown), which further is connected with the shaft 80 via a clutch (not shown). Preferably the most of the shaft 80, gear and clutch are enclosed in a protruding part 82 of the motor and drive gear housing 51, which part 82 extends perpendicularly out from the upper surface of the motor and drive gear housing, and extends thus in the same direction as the shaft 80. Preferably the protruding part 82 includes sleeves and bearings (not shown) to hold the shaft 80 in place, and to ensure as low resistance in the rotation of the shaft 80 as possible. In this way the drive means are well protected against external objects which else could damage the drive means and the fastening of the wing 52.

The motor and drive gear housing 51 has further preferably a curved exterior shape to provide as low resistance as possible as the control device 50/streamer is towed through the water. In addition the shape of the motor and drive gear housing 51 is adapted so that they together form an elongate streamlined body as they are arranged to the main body 52.

The motor and drive gear housing 51 includes further preferably fastening means 83 to lock the motor and drive gear housing 51 to the main body 53, lock means 84 to lock the motor and drive gear housings 51 mutually to the adjacent motor and drive gear housing 51, and connection means 85 for electrical connection and signal connection to the main body 53 for connection to the streamer energy system and control line. The drive means are preferably supplied with energy through the conductors in the streamer, via one or several rechargeable buffer batteries for back-up energy at the lack of energy, and to avoid overload in the streamer energy system.

After the main body 53 is connected between two streamer sections, the motor and drive gear housings 51 provided with wings 52 can be arranged to the main body 53. By rotating the lock disc 57 to unlocked position, the lock holes 66 of the lock disc 57 coincide with the holes 72 of the end part 58. The fastening means 83 for locking the motor and drive gear housing 51 to the main body 53, which preferably is specially designed lock pins adapted to the specially designed lock holes 66 of the lock disc 57, are inserted into the holes 72 of the end part 58 and into the lock holes 66 of the lock disc 57. Electrical and signal connection are also performed in that the connection means 85 for electricity and signals are connected to the electrical connection points provided in the main body 53. After all the three motor and drive gear housings 51 are adapted with the fastening means 83 in the lock holes 63, and mutually fixed via the locking means 84, the lock disc 57 is turned 57 from unlocked to locked position by means of a suitable tool, so that the lock disc 57 locks the fastening means 83 in the lock holes 66, and the motor and drive gear housings 51 provided with wings 52 are thus locked to the main body 53 and mutually locked to each other.

Each wing 52 is thus rotatable about an axis extending transversal of the streamer, and the wings 52 will respond to control signals and sensor means for independent adjustment of the respective angular position for the mentioned wing 52, for in this way to control the lateral and vertical position of the streamer.

As the motor and drive gear housing 51 provided with wings are removed from the main body 53, the streamer can easily be reeled onto a drum with the main body 53 still connected to the streamer. Similar the streamer can easily be reeled out from a drum by successively arranging motor and drive gear housings 51 provided with wings 52 as the streamer is deployed.

The control device 50 is preferably connected to an external control system of a survey vessel and controlled as described in the first embodiment.

It is obvious that the features of the two first embodiments can be combined to provide further embodiments.

Figure 9:
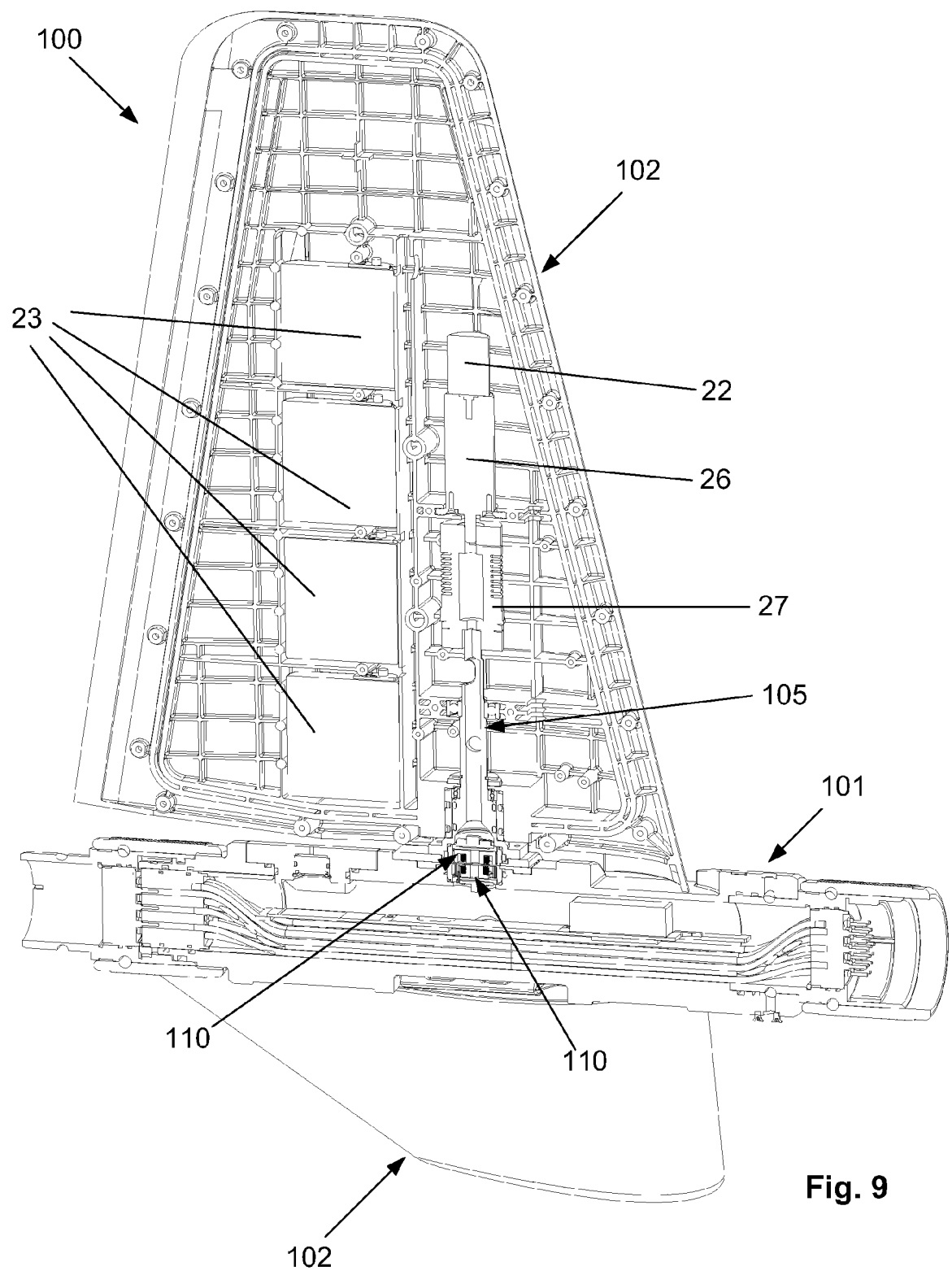
FIG. 9 shows a control device according to a third embodiment adapted for wireless/contactless transfer of communication and/or energy.

Referring now to FIG. 9 which shows an example of a third embodiment, in the form of a cross-section through a control device 100 according to the invention, adapted for wireless/contactless transfer of communication, i.e. signals/data, and/or energy between main body 101 and wings 102, preferably both communication and energy.

Figure 10A:
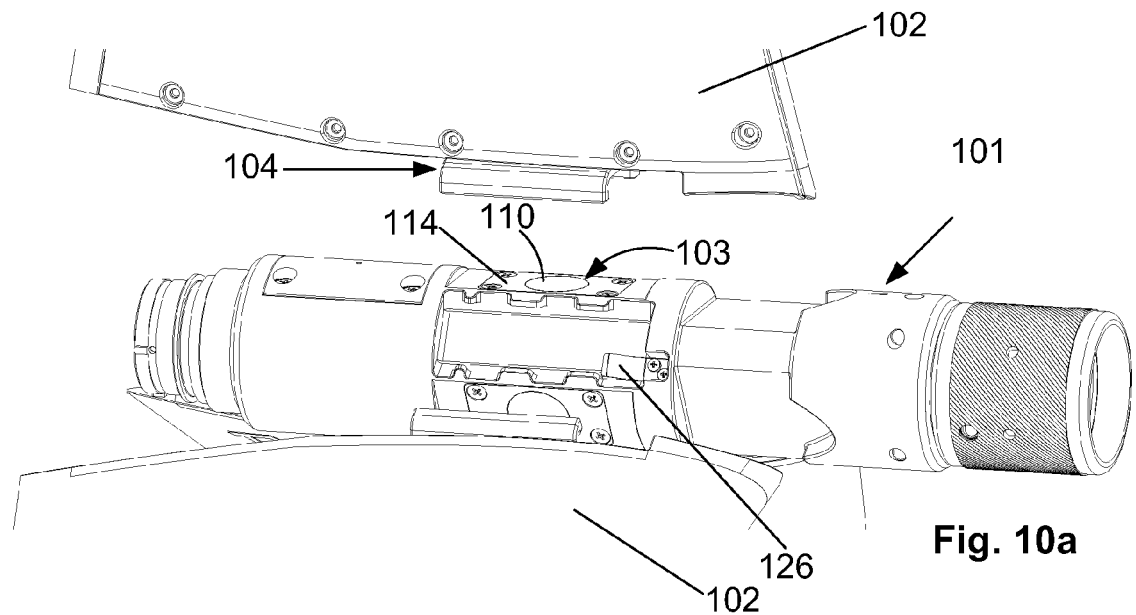
FIG. 10a-b show details of the arrangement of wing to the main body.
Figure 10B:
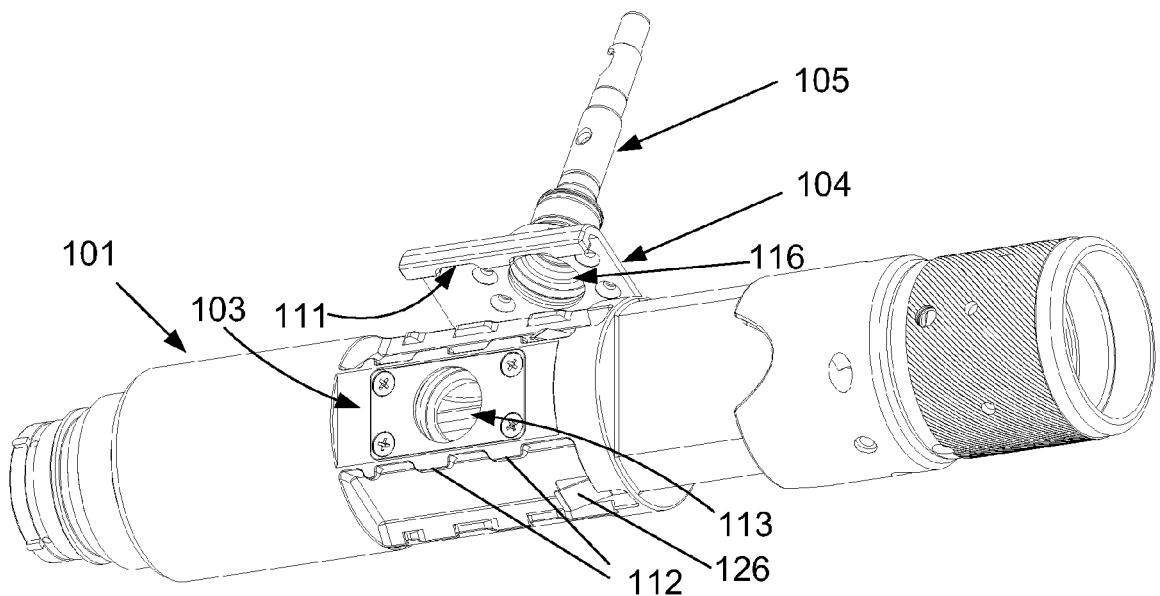

Referring now to FIGS. 10*a-b* which show details of the arrangement of a wing 102 to the main body 101. According to the third embodiment the main body 101 includes, as previous, specially designed fastening means 103 for fastening of the wings 102 mechanically to the main body 101. The wings 102 are, as previous, provided with a fastening part 104 which is adapted for mechanical fastening to the main body 101 via its fastening means 103. In contrast to the previous embodiments, the main body 101 and wings 102 do not need to include means for the connection of electricity or control signals, as this embodiment is adapted for wireless/contactless transfer of energy and communication, i.e. signals/data, further described below.

The wings 102 include, as for the previous embodiments, drive means, batteries and possible sensors, which are not described further herein. The wing further includes, as previous, a shaft 105 (FIG. 10*b*), which by means of a specially designed end part 106, shown in FIG. 11*a*, is arranged to the fastening part 104 of the wing.

The drive means in the previous embodiments where provided with energy through conductors in the streamer, via at least one rechargeable battery for back-up energy at lack of energy, and to avoid overload in the energy system of the streamer, but in contrast to the two embodiments described above, the wings 102 are not mechanically connected to the main body 101/streamer for the transfer of communication and energy, but by means of means 110 for wireless/contactless transfer of communication, i.e. signals/data, and energy, further described below.

Figure 11A:
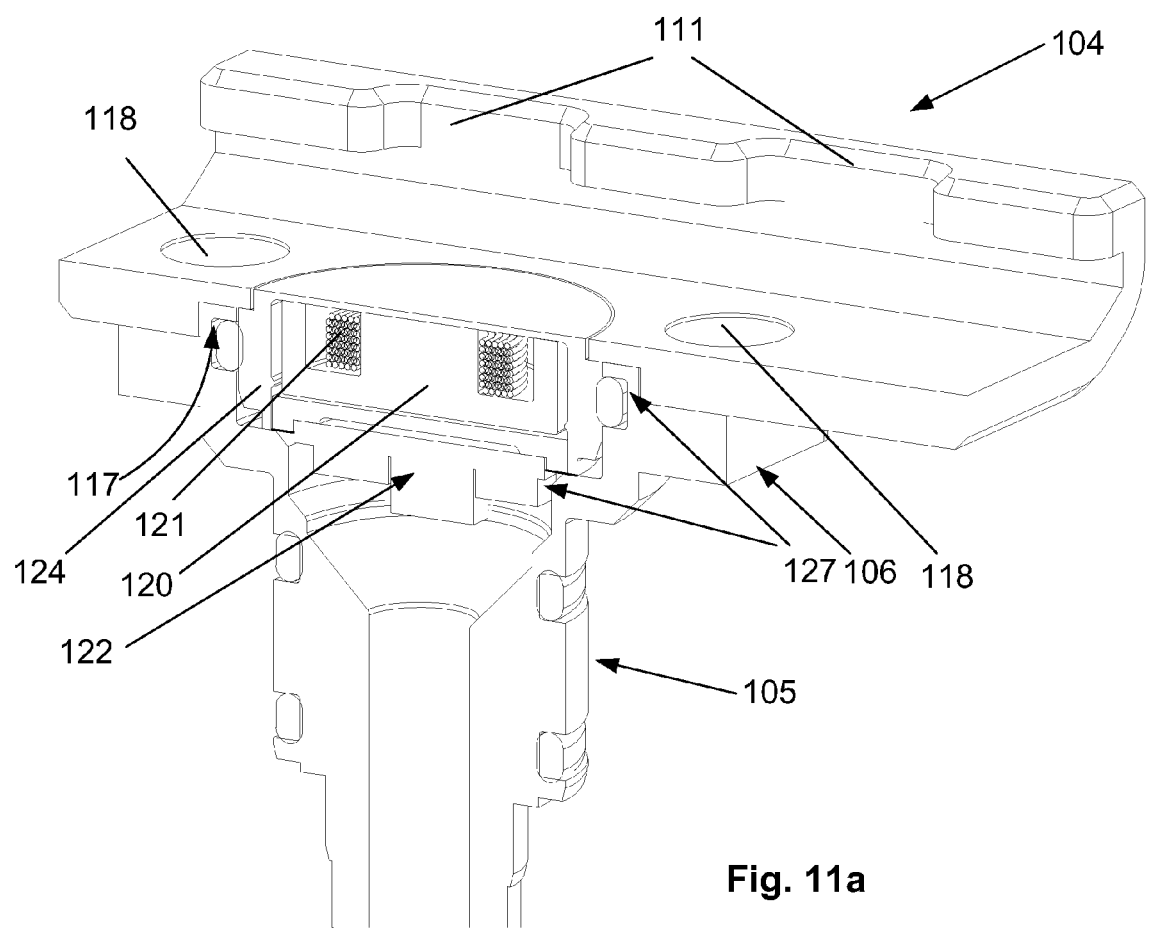
FIG. 11a-b show details of means for wireless/contactless transfer of communication and/or energy.

The shaft 105 in this embodiment is adapted to house means 110 for wireless/contactless transfer of energy and communication, and for mechanical fastening to fastening part 104 for wing 102 by means of the specially designed end piece 106, as shown in FIG. 11*a*.

Figure 11B:
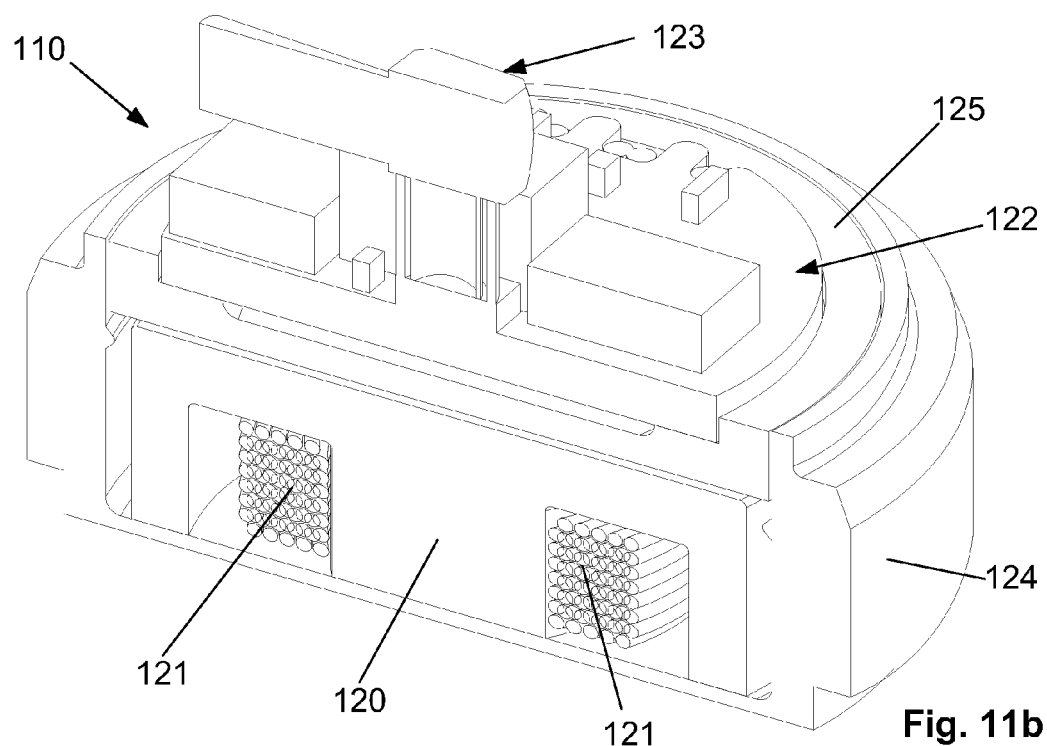

Referring now to FIGS. 11*a* and 11*b* which show details of means 110 for wireless/contactless transfer of communication, i.e. data/signals, and energy, and details of fastening part 104 for wing 102 and fastening between shaft 105 and fastening part 104 for wing 102.

The fastening part 104 for wing, as also shown in FIGS. 10*a-b*, preferably has a mainly elongate shallow U-profile with a cerif, with the opening orientated down against the main body 101. The cerif preferably includes tracks or recesses 111 adapted to the specially designed fastening means 103 of the main body 101, which preferably are formed by a mainly rectangular shape with protruding fastening elements 112. In contrast to the first embodiment, where the main body had specially designed fastening and connecting means, where the fastening part of the wing interlocked with a recess in the main body, the main body 101 is now adapted so that the fastening part 104 of the wing interlock with the exterior of fastening means 102 adapted in the main body 101, as shown in FIG. 10a. The fastening part 104 for wing and fastening means 103 in the main body 101 are thus adapted for rapid connection and rapid disconnection.

The main body 101 can further include a safety means 126, such as an elastic or spring-loaded element to hold the wing 102 in place after the wing 102 is arranged to the main body 101.

The main body 101 further includes a recess 113, as shown in FIG. 10b, with a through centrally arranged hole for the arrangement of means 110 for wireless/contactless transfer, and a sleeve/cover 114, as shown in FIG. 10a, to fasten means 110 for wireless/contactless transfer, which sleeve/cover 114 has a through centrally arranged hole 115 adapted to the means 110 for wireless/contactless transfer, which means 110 are described in detail below.

The fastening part 104 for wing further includes a through hole 116, as shown in FIGS. 10b and 11a, preferably circular and centrally arranged, adapted to means 110 for wireless/contactless transfer of energy and communication, and a recess 117, as shown in FIG. 11a, adapted the end piece 106 of the shaft 105, and fastening means, such as through holes 118, for the fastening of the shaft 105 thereto.

The means 110 for wireless/contactless transfer of energy and communication, shown in detail in FIG. 11b, are preferably equal for both the wing and main body 101, and arranged in each wing 102 and correspondingly for each wing at suitable positions in the main body 101, in such a way that that the means 110 for wireless/contactless transfer in the main body 101 and wing 102 are arranged against each other, preferably with the smallest possible distance, preferably in the rotation axis of the wing in relation to the main body 101.

The means 110 for wireless/contactless transfer include a core 120, one or more coils 121, a circuit card 122, coaxial connectors 123, and encapsulation 124.

The core 120 is preferably a ferrite core or similar, which preferably mainly has a disc-shape with a given depth/width, which further preferably has a mainly circular recess at the one side to house the coil(s) 121. The coil(s) is/are wound with adapted thread and number of windings for the optimization of efficiency for the transfer of energy/signal/data. Also the diameter/size of the core 120 will be vital for how high efficiency the system has, and must thus be adapted so that the actual efficiency is achieved.

If it is adequate, the means 110 for wireless/contactless transfer can also include a buffer plate 125, which is arranged between the core 120 and the electronic card 122 to avoid short-circuiting, which buffer plate 125 preferably is provided with control holes for coil thread to the circuit card 122.

Further, the coil(s) 121 and core 120, and buffer plate 125, if it is used, are casted in an encapsulation 124 of a material with low water break-through, low water absorption, low dielectric coefficient and high weather resisting (treated for UV radiation), such as polyurethane.

An advantage with the use of a buffer plate 125 is that by cast-in/encapsulation of the buffer plate 125 between core and electronic card 122, short-circuiting is also avoided, but this can also be achieved by replacing the buffer plate 125 with an encapsulation, something which will be chosen in the most cases.

The encapsulation 124 is preferably casted in with special epoxy to ensure a good fastening against the components. The cast-in of the encapsulation 124 is preferably performed in a vacuum chamber for the removal of air bubbles and thus ensures better pressure properties.

The encapsulation 124 preferably has a mainly disc-shape with a given width, and which preferably at its ends is provided with steps 126a-b, adapted for arrangement in the shaft 105 and to the centrally arranged through hole 116 in the fastening part 104 of the wing, respectively, and for arrangement in the recess 113 of the main body 101, and fastening by means of the sleeve/cover 114. Between the shaft 105 and fastening part 104 for wing and means 110 for wireless/contactless transfer, and between the recess 113 and sleeve/cover 114 and means 110 for wireless/contactless transfer, one or more O-ring seals 127, preferably double O-rings, in such a way that that water is prevented from entering. The means 110 for wireless/contactless transfer are arranged in such a way that the circuit card 121 is facing the shaft 105 of the wing and the interior of the main body 101, in such a way that the core 120 and coil(s) 121 are facing each other for the means 110 for wireless/contactless transfer in the wing and main body 101.

The circuit card 122 is arranged/provided with control electronics adapted the encapsulation 124 with core 120 and coil(s) 121, and possibly buffer plate 125, and includes electronics for communication/signal processing, which circuit card 122 is arranged against the encapsulation 124, against the buffer plate 125 if it is used. The circuit card further includes its own coaxial connector 123 for the connection of radio signals. The circuit card 122 further includes one or more coil plugs for the connection of the coil threads. Further the circuit card 122 includes connection for "plug electronics" for charge/supply circuit of the circuit card of the wing 102 and circuit card of the main body 101, and connection of "plug electronics" to a radio chip on the circuit card of the wing 102 and circuit card of the main body 101. It should be mentioned that the different plugs/connectors can be soldered directly onto the circuit card.

In this way it is provided a wireless/contactless transfer of energy and communication, where the coil(s) 121 is/are used for both energy transfer and as an antenna for communication. By that the transfer of energy and transfer of communication are performed at different frequencies, which frequencies preferably are far from each other, they will not disturb one another.

In this way it is provided a wireless/contactless transfer between a main body 101 and wings 102, which wireless/contactless transfer can be both unidirectional or bidirectional, which results in that the system is far more robust for operating in a demanding environment, as streamers usually operate in. Further, the wings 102 are not mechanically connected to the streamer or main body 101 electronically or for signals, something resulting in more stabile operating conditions for the total system and less danger for function failure.

It should finally be mentioned that the latter embodiment easily can be combined with the two first embodiments to provide further embodiments.

Modifications

The shape and size of the wings can vary according to desired properties for the control device.

A twist/rotation indicator or similar can be arranged in connection with the main body to identify if a twist/rotation has occurred in the streamer.

Wireless communication, such as radio, infrared light, ultrasound or similar can be arranged between the main body and wings, or between main body and motor and drive gear housings, instead of a mechanical connection. The wings/motor and drive gear housings can thus be remotely controlled to be released/removed from the control device during an operation, if a need for this should arise, without this interfering the operation.

By that the control device is provided with wireless communication it will also be possible with a communication with an external unit for calibration and diagnostics, for example at the quarterdeck of a vessel.

The control device can be provided with an adaptive controller to improve the local control loop to achieve a more rapid response to desired changes of the control device. An adaptive controller will also contribute in that the control device better can counteract factors which affect a streamer and which changes over time and/or as the streamer/control device moves through the water, including velocity changes.

It can also be preferable to arrange a control pin in the wing, which control pin extends down into a track with limited extension, arranged at the upper surface of the motor and drive gear housing, which control pin can travel in the track. This can be used to limit the wing deflection of the wing, for example in the case of function failure of the wing.

Even though it is described that the means for wireless/contactless transfer of energy and/or communication preferably have a disc-shape, it is obvious that the means can have other shapes, for example the core can be E-shaped, pot-shaped, U-shaped, bar-shaped or similar suitable shapes. The core can be of different materials, such as ferrite with low loss or metal powder, but preferably a material with low permeability.

The means for wireless/contactless transfer can further include separate coils for transfer of communication and for transfer of energy.

As described, the means for wireless/contactless transfer can further include a buffer plate between the circuit card and the core to prevent short-circuiting, but this can also be achieved by arranging a layer with cast-in material of the same type as the encapsulation between the circuit card and core, or that the circuit card is provided with an insulating material at the surface facing the core.

The buffer plate can also be casted in between the core and the electronic card to avoid short-circuiting.

The invention claimed is:

1. A control device (10) for controlling the position of an instrumented cable towed in water, and/or a towed instrumented cable array with the possibility to control the individual instrumented cables, both in shape and position, in relation to other instrumented cables and by that counteract cross currents and/or other dynamic forces which affect a towed array behind a seismic survey vessel, which control device (10) includes a main body (12) having a first end and a second end, and a connector (14a-b) located at said first and second ends, provided with a device (14a-b) for wherein said connector (14a-b) provides mechanical and electrical connection of the control device (10) in series between two adjacent sections of an instrumented cable, wherein the control device includes at least two wings (11) formed by a wing part (20) and a fastening part (30), which are connected mutually by a shaft (24),
  wherein at least one battery (23), electronics and circuit card (200), sensors, and at least one electrical motor (22) are integrated in each of the wings (11) to control the respective angular position of the wings (11) and to control the lateral and vertical position of the instrumented cable,
  said fastening part (30) exhibits a mainly rectangular shape and is provided with protruding fastening elements (30a) along longitudinal sides of the mainly rectangular shape and which fastening part (30) is provided a connector (31) protruding in longitudinal direction from one side of the fastening part (30),
  said main body (12) including separate fastening devices (15) for each of the wings (11) in the form of a mainly rectangular recesses extending in longitudinal direction of the main body (12), which recesses are provided with cuts (15a) along longitudinal sides of the rectangular recess, and the main body (12) includes connectors (32) accessible from the rectangular recesses,
  wherein the recesses (15) and cuts (15a) of the main body (12) are adapted to receive the mainly rectangular fastening parts (30) with protruding elements (30a) of the wings (11) for detachable mechanical fastening of the wings (11) to the main body (12) and connection of the connector (31) of each wing (11) to connectors (32) in the main body (12) for signal connection between the main body (12) and wing (11) and for transfer of energy for charging of the batteries (23) in the wing (11).

2. A control device (100) for controlling the position of an instrumented cable towed in water, and/or a towed instrumented cable array with the possibility to control the individual instrumented cables, both in shape and position, in relation to other instrumented cables and by that counteract cross currents and/or other dynamic forces which affect a towed array behind a seismic survey vessel, which control device (100) includes a main body (101) having a first end and a second end, and a connector (14a-b) located at said first and second ends, provided with a device (14a-b) for wherein said connector (14a-b) provides mechanical and electrical connection of the control device (100) in series between two adjacent sections of an instrumented cable, wherein the control device includes at least two wings (102) formed by a wing part (20) and a fastening part (104), which are connected mutually by a shaft (105),
  wherein at least one battery (23), electronics and circuit card (200), sensors, and at least one electrical motor (22) are integrated in each of the wings (102) to control the respective angular position of the wings (102) and to control the lateral and vertical position of the instrumented cable,
  said fastening (104) is a mainly elongate shallow U-profile with a cerif, with the opening orientated down against the main body (101), and where the cerif is provided with tracks or recesses (111),
  said main body (101) including separate fastening devices (103) for each wing (102), which fastening devices (103) exhibit a mainly rectangular shape with exterior protruding fastening elements (112) along longitudinal sides of the rectangular shape,
  wherein the mainly elongate shallow U-profile with a cerif with tracks or recesses (111) of the fastening part (104) of the wing (101) is adapted for interlocking with the rectangular shape and fastening elements (112) of the main body (101) for detachable mechanical fastening of the wing (102) to the main body (101),
  and where the fastening parts (104) of the wing (102) and the fastening devices (103) of the main body (101) is provided with a one or more coils (121) arranged around a core (120) for wireless and contactless communication of signals/data from main body (101) to wing (102), wing (102) to main body (101) or both ways, and for wireless and contactless transfer of energy for charging of the batteries (23) in the wing (102).

3. A control device according to claims 1 or 2, wherein the main body (12, 101) is mainly an elongated streamlined housing.

4. A control device according to claim 3, wherein the main body (12, 101) includes recesses (16) adapted to receive a guard (29).

5. A control device according to claims 1 or 2, wherein a guard (29) is arranged between the wing part (20) and fastening part (30, 104), wherein the guard (29) is integrated as part of the wing (11, 102), or wherein the guard (29) is fastened to the wing (11, 102) as a separate part, wherein the guard (29) mainly has a longitudinal ellipse-shape, with an exterior and interior surface, said surfaces having a shape similar to the cross-section of the wing (11, 102), and a size adapted for travelling in the adapted recesses (16) in the main body (12, 101), wherein the guard (29) prevents objects in the water from being attached between the main body (12, 101) and the wing (11, 102).

6. A control device according to claim 2, wherein the one or more coil(s) (121) provide the control device (100) with an antenna for radio communication of control signals and data, unidirectional or bidirectional.

7. A control device according to claim 2, wherein the coil(s) (121) and core (120) are cast into an encapsulation (124).

8. A control device according to claim 7, wherein cast-in of the encapsulation (124) is carried out in a vacuum chamber for removal of air bubbles.

9. A control device according to claim 7, wherein the cast-in of the encapsulation (124) comprises a material that has been treated for UV radiation.

10. A control device according to claim 2, wherein the one or more coils (121) are connected to a circuit card (122) that includes one or more of:
control electronics adapted to the encapsulation (124) with core (120) and coil(s) (121),
electronics for communication/signal processing,
coaxial connections (123) and connections for radio signals, and
connections for coil thread.

11. A control device according to claim 10, wherein the circuit card (122) includes one or more of:
connection of "plug electronics" to a charge/supply circuit of a circuit card in main body (101) and in wings (102),
connection of "plug electronics" to connections for radio signals on a circuit card in main body (101) and in wings (102).

12. A control device according to claim 2, wherein a buffer plate (125), which is arranged between the core (120) and circuit card (122), wherein the buffer plate (125) is provided with control holes for coil thread.

13. A control device according to claim 2, wherein the main body (101) and the fastening part (104) and shaft (105) of the wing (102) are adapted to house the core (120), coil(s) (121), circuit card (122), and encapsulation (124).

14. Control device according to claim 2, wherein O-ring seals (127) are arranged between the encapsulation (124) and fastening part (103) and the encapsulation (124) and the shaft (105) and fastening part (104).

15. A control device according to claim 2, wherein the core (120) and coil(s) in the main body (101) and fastening part (104) are arranged towards each other, without being in contact, in the axis of rotation of the wing (102) in relation to the main body (101).

16. A control device according to claims 1 or 2, wherein the main body (12, 101) further includes a circuit card and electronics for communication with an external control unit via the control line of the instrumented cable for controlling the control device (10, 100), and connection to the power system of the instrumented cable.

17. A control device according to claims 1 or 2, wherein the wing (11, 102) further includes gear (26), shaft (24) and clutch (27), and sleeves and bearings (28).

18. A control device according to claims 1 or 2, wherein the wings (11, 102) are distributed with the same mutual distance around the main body (12, 101).

19. A control device according to claims 1 or 2, wherein the wings (11, 102) are rotatable about their respective axis of rotation, which extends mainly perpendicularly out from the longitudinal axis of the main body (12, 101).

20. A control device according to claims 1 or 2, wherein the adjustment of the angular position of the wings (11, 102) is performed by the one or more electrical motors (22), via gear (26), clutch (57) and shaft (24, 105) under the control of the circuit card and electronics in the wing (11, 102), and receiving settings from the circuit card and electronics in the main body (12, 101), which receives control parameters from an external unit.

21. A control device according to claims 1 or 2, wherein sensors in the wing (11, 102) include a wing position sensor and/or an acoustic position sensor and/or a depth sensor or other sensors which can be used to provide information for controlling a control device (10, 100); and wherein the main body (12, 101) is provided with a roll sensor; and that it can be provided with a depth sensor and/or acoustic position sensor or other sensors which are able to provide information for controlling a control device (10, 100).

22. A control device according to claim 21 wherein the main body (11, 52, 102) is provided with a depth sensor.

23. A control device according to claims 1 or 2, wherein the wings (11, 102) are supplied with power through conductors in the instrumented cable via one or more rechargeable buffer batteries (23) for back-up force at lack of power, and to avoid overload in the power system of the instrumented cable; and that the feed-through of conductors between the cable sections are separated from the control device (10, 100) to avoid function failure in case of mechanical failure in the control device (10, 100).

24. A control device according to claims 1 or 2, wherein the control device (10, 100), by means of the core (120), coil(s) (121), and circuit card (122), is arranged for remote release of wings (102) from the main body (101).

25. A control device according to claims 1 or 2, wherein the control device (10, 100) is provided with a wireless communication device, for communication with an external unit for calibration and diagnostics.

26. A control device according to claim 25, wherein the wireless communication devices include one or more of a radio, infrared light, and ultrasound.

27. A control device according to claims 1 or 2, wherein the control device (10, 100) is provided with an adaptive controller.

28. A control device according to claims 1 or 2, wherein the control device (10, 100) can be operated both autonomously and manually.

29. A control device according to claim 2, wherein the core is a ferrite core.

* * * * *